United States Patent
Wang

(10) Patent No.: US 9,672,075 B2
(45) Date of Patent: Jun. 6, 2017

(54) METHOD, APPARATUS, AND SYSTEM FOR IMPLEMENTING HOT MIGRATION OF VIRTUAL MACHINE

(71) Applicant: Huawei Technologies Co., Ltd., Shenzhen, Guangdong (CN)

(72) Inventor: Hua Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 14/724,367

(22) Filed: May 28, 2015

(65) Prior Publication Data
US 2015/0261581 A1    Sep. 17, 2015

Related U.S. Application Data

(63) Continuation of application No. PCT/CN2013/079570, filed on Jul. 18, 2013.

(30) Foreign Application Priority Data

Nov. 30, 2012    (CN) .......................... 2012 1 0504276

(51) Int. Cl.
*G06F 12/02*    (2006.01)
*G06F 9/50*     (2006.01)
(Continued)

(52) U.S. Cl.
CPC ............ *G06F 9/5088* (2013.01); *G06F 3/065* (2013.01); *G06F 3/0619* (2013.01);
(Continued)

(58) Field of Classification Search
CPC ...... G06F 12/02; G06F 9/4558; G06F 9/4856; G06F 9/5088; G06F 2009/4557;
(Continued)

(56) References Cited

U.S. PATENT DOCUMENTS 9,197,489 B1 *   11/2015   Vincent ................. H04L 67/148
                                                             707/809
2009/0007106 A1    1/2009   Araujo, Jr. et al.
(Continued)

FOREIGN PATENT DOCUMENTS

CN    101101562 A    1/2008
CN    102081552 A    6/2011
(Continued)

OTHER PUBLICATIONS

Christopher Clark, et al., "Live Migration of Virtual Machines", 2nd Symposium on Networked Systems Design & Implementation, vol. 2, 2005, p. 273-286.
(Continued)

*Primary Examiner* — Hiep Nguyen

(57) ABSTRACT

The present invention discloses a method for implementing hot migration of a virtual machine. In this method, a source virtual machine migration management apparatus on a source physical machine determines non-temporary data memory pages of a virtual machine on the source physical machine, copies the non-temporary data memory pages from the source physical machine to a target physical machine, cyclically copies dirty pages, which are generated in the process of copying the non-temporary data memory pages, from the source physical machine to the target physical machine until a ratio of a quantity of dirty pages which are not yet copied to a quantity of the non-temporary data memory pages is less than a preset value; and performs migration of the virtual machine when the ratio is less than the preset value.

8 Claims, 9 Drawing Sheets

(51) Int. Cl.
G06F 9/455 (2006.01)
G06F 9/48 (2006.01)
G06F 3/06 (2006.01)

(52) U.S. Cl.
CPC .......... *G06F 3/0647* (2013.01); *G06F 3/0685* (2013.01); *G06F 9/45558* (2013.01); *G06F 9/4856* (2013.01); *G06F 12/02* (2013.01); *G06F 2009/4557* (2013.01)

(58) Field of Classification Search
CPC .... G06F 3/0646; G06F 3/0647; G06F 3/0619; G06F 3/065; G06F 3/0685
See application file for complete search history.

(56) References Cited

U.S. PATENT DOCUMENTS

| | | | |
|---|---|---|---|
| 2009/0064136 A1 | 3/2009 | Dow et al. | |
| 2009/0228629 A1 | 9/2009 | Gebhart et al. | |
| 2011/0066597 A1* | 3/2011 | Mashtizadeh | G06F 3/0617 707/640 |
| 2011/0145471 A1* | 6/2011 | Corry | G06F 9/4856 711/6 |
| 2011/0302577 A1* | 12/2011 | Reuther | G06F 9/45558 718/1 |
| 2011/0320556 A1 | 12/2011 | Reuther | |
| 2012/0011508 A1 | 1/2012 | Ahmad | |
| 2012/0030306 A1 | 2/2012 | Kami | |
| 2012/0096460 A1 | 4/2012 | Sekiguchi et al. | |
| 2012/0110237 A1 | 5/2012 | Li et al. | |
| 2013/0060988 A1 | 3/2013 | Dow et al. | |
| 2013/0205113 A1* | 8/2013 | Ahmad | G06F 12/023 711/170 |
| 2013/0326175 A1* | 12/2013 | Tsirkin | G06F 9/45558 711/162 |
| 2015/0149687 A1* | 5/2015 | Tsirkin | G06F 12/109 711/6 |

FOREIGN PATENT DOCUMENTS

| | | |
|---|---|---|
| CN | 102103524 A | 6/2011 |
| CN | 102314378 A | 1/2012 |
| CN | 102597958 A | 7/2012 |
| CN | 102662723 A | 9/2012 |
| CN | 102681913 A | 9/2012 |
| WO | WO 2010/126048 A1 | 11/2010 |

OTHER PUBLICATIONS

Yoshiaki Tamura, et al., "Virtual Machine Synchronization for High Availability Clusters", Apr. 17, 2007, 17 pages.

* cited by examiner

METHOD, APPARATUS, AND SYSTEM FOR IMPLEMENTING HOT MIGRATION OF VIRTUAL MACHINE

CROSS REFERENCE TO RELATED APPLICATION

This application is a continuation of International Application No. PCT/CN2013/079570, filed on Jul. 18, 2013, which claims priority to Chinese Patent Application No. 201210504276.4, filed on Nov. 30, 2012, both of which are hereby incorporated by reference in their entireties.

TECHNICAL FIELD

Embodiments of the present invention relate to a virtualized computer system, and in particular, to a method, an apparatus, and a system for implementing hot migration of a virtual machine.

BACKGROUND

Virtual machine technologies are being widely applied to the field of information technologies and are penetrating into the field of communications. A hot migration technology is a great technical highlight for a virtual machine, and enables a virtual machine to migrate between two physical machines, and the migration process has little impact on service processing. An existing virtual machine hot migration technology uses a pre-copy method. In this method, all memory pages of a virtual machine are first copied from a source physical machine to a target physical machine, and all the memory pages are monitored in the copying process, where pages modified in the copying process are labeled as dirty pages; after copying of all the memory pages is completed, the generated dirty pages are copied. It should be noted that in the dirty page copying process, some memory pages may be also modified, and in this case, these modified memory pages also need to be labeled as dirty pages, so that these dirty pages can be copied from the source physical machine to the target physical machine next time dirty page copying is performed. In this way, dirty pages are cyclically copied to the target machine until a proportion of dirty pages is less than a preset value (for example, 5%), and after the proportion of the dirty pages is less than the preset value, migration of the virtual machine is performed, that is, the virtual machine is stopped, dirty pages which are not yet copied are copied from the source physical machine to the target physical machine at a time, and then the virtual machine is restored on the target physical machine.

However, in the cyclical copying process of dirty pages, as long as one byte of a memory page is modified, the memory page is labeled as a dirty page. Therefore, a great amount of changed temporary data in a system is cyclically copied to the target physical machine, thereby causing great time consumption of virtual machine hot migration and a great waste of resources such as CPU processing resources and network bandwidth of the system, and it is estimated that the percentage of wasted resources exceeds 90%. Therefore, how to reduce a quantity of times of dirty page cyclical copying caused by changes in a great amount of temporary data in a system and a quantity of dirty pages which are copied in each cyclical copying process, so as to reduce a system resource waste caused by virtual machine hot migration, is a problem urgently to be solved in the virtual machine hot migration technology.

SUMMARY

Embodiments of the present invention provide a method, an apparatus, and a system for implementing hot migration of a virtual machine, so as to save system resources in a virtual machine hot migration process.

According to a first aspect, an embodiment of the present invention provides a method for implementing hot migration of a virtual machine. The method includes: determining, by a source virtual machine migration management apparatus on a source physical machine, non-temporary data memory pages of a virtual machine on the source physical machine; copying the non-temporary data memory pages from the source physical machine to a target physical machine; cyclically copying dirty pages, which are generated in the process of copying the non-temporary data memory pages, from the source physical machine to the target physical machine until a ratio of a quantity of dirty pages which are not yet copied to a quantity of the non-temporary data memory pages is less than a preset value; and performing migration of the virtual machine when the ratio of the quantity of the dirty pages which are not yet copied to the quantity of the non-temporary data memory pages is less than the preset value.

With reference to the first aspect, in a first possible implementation manner, the performing migration of the virtual machine includes: stopping running the virtual machine; copying the dirty pages which are not yet copied and temporary data memory pages on the virtual machine from the source physical machine to the target physical machine; and sending first indication information to a target virtual machine migration management apparatus on the target physical machine, where the first indication information is used for instructing the target virtual machine migration management apparatus to restore the virtual machine on the target physical machine.

With reference to the first aspect, in a second possible implementation manner, the performing migration of the virtual machine includes: notifying, through a migration pre-notification interface, the virtual machine to stop running a temporary data process; stopping the virtual machine from running when a stopping success response notified by the virtual machine is obtained through the migration pre-notification interface, where the stopping success response is used for indicating that the virtual machine successfully stops running the temporary data process; copying the dirty pages, which are not yet copied, from the source physical machine to the target physical machine; and sending first indication information to a target virtual machine migration management apparatus on the target physical machine, where the first indication information is used for instructing the target virtual machine migration management apparatus to restore the virtual machine on the target physical machine.

With reference to the second possible implementation manner of the first aspect, in a third possible implementation manner, the method further includes: sending second indication information to the target virtual machine migration management apparatus, where the second indication information is used for instructing the target virtual machine migration management apparatus to notify, through a migration completion notification interface, the virtual machine to restart the stopped temporary data process.

With reference to the first aspect or any possible implementation manners of the first to third possible implementation manners of the first aspect, in a fourth possible implementation manner, the determining non-temporary data memory pages of a virtual machine on the source physical machine includes: obtaining, through a temporary data process memory page registration interface, information about the temporary data memory pages which is notified by the virtual machine; and determining that memory pages except the temporary data memory pages on the virtual machine are non-temporary data memory pages according to the information about the temporary data memory pages.

According to a second aspect, an embodiment of the present invention provides a method for implementing hot migration of a virtual machine. The method includes: determining, by a virtual machine on a source physical machine, temporary data memory pages of the virtual machine; and notifying a source virtual machine migration management apparatus on the source physical machine of information about the temporary data memory pages through a temporary data process memory page registration interface, so that the source virtual machine migration management apparatus determines non-temporary data memory pages of the virtual machine according to the information about the temporary data memory pages and copies the non-temporary data memory pages in a process of performing hot migration of the virtual machine from the source physical machine to a target physical machine.

With reference to the second aspect, in a first possible implementation manner, after the notifying a source virtual machine migration management apparatus on the source physical machine of information about the temporary data memory pages through a temporary data process memory page registration interface, the method further includes: obtaining, through a migration pre-notification interface, a temporary data process stopping notification notified by the source virtual machine migration management apparatus; stopping, according to the temporary data process stopping notification, running a temporary data process; and when the temporary data process is successfully stopped, notifying the source virtual machine migration management apparatus of a stopping success response through the migration pre-notification interface, so that the source virtual machine migration management apparatus stops, according to the stopping success response, the virtual machine from running and instructs a target virtual machine migration management apparatus on the target physical machine to restore the virtual machine on the target physical machine.

With reference to the first possible implementation manner of the second aspect, in a second possible implementation manner, the method further includes: when the virtual machine is restored by the target virtual machine migration management apparatus, obtaining, by the virtual machine through a migration completion notification interface, a temporary data process restarting notification notified by the target virtual machine migration management apparatus; and restarting the stopped temporary data process according to the temporary data process restarting notification.

With reference to the second aspect or with reference to the first or second possible implementation manner of the second aspect, in a third possible implementation manner, the determining temporary data memory pages includes: obtaining, through a temporary data process registration interface, information about the temporary data process notified by an application; and determining that memory pages occupied by the temporary data process are temporary data memory pages according to the information about the temporary data process.

With reference to the second aspect or with reference to the first or second possible implementation manner of the second aspect, in a fourth possible implementation manner, the determining temporary data memory pages includes: determining a temporary data dedicated memory block; and determining that all memory pages in the temporary data dedicated memory block are the temporary data memory pages; and the method further includes: obtaining, through a process creation interface, a process type notified by the application, where the process type includes temporary data process or persistent data process; and when the process type is temporary data process, allocating the memory pages in the temporary data dedicated memory block to the temporary data process.

According to a third aspect, an embodiment of the present invention provides a virtual machine migration management apparatus. The virtual machine migration management apparatus includes: a determining module, configured to determine non-temporary data memory pages of a virtual machine on a source physical machine; a copying module, configured to copy the non-temporary data memory pages determined by the determining module from the source physical machine to a target physical machine, and cyclically copy dirty pages, which are generated in the process of copying the non-temporary data memory pages, from the source physical machine to the target physical machine until a ratio of a quantity of dirty pages which are not yet copied to a quantity of the non-temporary data memory pages is less than a preset value; and a migration module, configured to perform migration of the virtual machine when the ratio of the quantity of the dirty pages which are not yet copied by the copying module to the quantity of the non-temporary data memory pages is less than the preset value.

With reference to the third aspect, in a first possible implementation manner, the migration module includes: a first stopping unit, configured to stop the virtual machine from running; a first copying unit, configured to: after the first stopping unit stops the virtual machine from running, copy remnant dirty pages, which are generated in the process of copying the non-temporary data memory pages, and temporary data memory pages on the virtual machine from the source physical machine to the target physical machine; and a first sending unit, configured to: after the first copying unit copies the dirty pages which are not yet copied and the temporary data memory pages on the virtual machine, send first indication information to a target virtual machine migration management apparatus on the target physical machine, where the first indication information is used for instructing the target virtual machine migration management apparatus to restore the virtual machine on the target physical machine.

With reference to the third aspect, in a second possible implementation manner, the migration module includes: a first notification unit, configured to notify, through a migration pre-notification interface, the virtual machine to stop running a temporary data process; a first obtaining unit, configured to obtain, through the migration pre-notification interface, a stopping success response notified by the virtual machine, where the stopping success response is used for indicating that the virtual machine successfully stops, according to a notification of the first notification unit, running the temporary data process; a second stopping unit, configured to: when the first obtaining unit obtains the stopping success response notified by the virtual machine, stop the virtual machine from running; a second copying unit, configured to: when the second stopping unit stops running the virtual machine, copy the dirty pages, which are not yet copied, from the source physical machine to the target physical machine; and a second sending unit, configured to: after the second copying unit copies the dirty pages, which are not yet copied, from the source physical machine to the target physical machine, send first indication information to a target virtual machine migration management apparatus on the target physical machine, where the first indication information is used for instructing the target virtual machine migration management apparatus to restore the virtual machine on the target physical machine.

With reference to the second possible implementation manner of the third aspect, in a third possible implementation manner, the virtual machine migration management apparatus further includes: a sending module, configured to send second indication information to the target virtual machine migration management apparatus, where the second indication information is used for instructing the target virtual machine migration management apparatus to notify, through a migration completion notification interface, the virtual machine to restart the stopped temporary data process.

With reference to the third aspect or any possible implementation manner of the first to third possible implementation manners of the third aspect, in a fourth possible implementation manner, the determining module includes: an obtaining unit, configured to obtain, through a temporary data process memory page registration interface, information about the temporary data memory pages which is notified by the virtual machine; and a determining unit, configured to determine that memory pages except the temporary data memory pages on the virtual machine are non-temporary data memory pages according to the information about the temporary data memory pages obtained by the obtaining unit.

According to a fourth aspect, an embodiment of the present invention provides a virtual machine. The virtual machine includes: a determining module, configured to determine temporary data memory pages of the virtual machine; and a notification module, configured to notify, through a temporary data process memory page registration interface, a source virtual machine migration management apparatus on a source physical machine of information about the temporary data memory pages determined by the determining module, so that the source virtual machine migration management apparatus determines non-temporary data memory pages of the virtual machine according to the information about the temporary data memory pages and copies the non-temporary data memory pages in a process of performing migration of the virtual machine from the source physical machine to a target physical machine.

With reference to the fourth aspect, in a first possible implementation manner, the virtual machine further includes: a first obtaining module, configured to: after the notification module notifies the source virtual machine migration management apparatus on the source physical machine of the information about the temporary data memory pages through the temporary data process memory page registration interface, obtain, through a migration pre-notification interface, a temporary data process stopping notification notified by the source virtual machine migration management apparatus; and a stopping module, configured to stop, according to the temporary data process stopping notification obtained by the first obtaining module, running a temporary data process; and the notification module is further configured to: when the stopping module successfully stops running the temporary data process, notify the source virtual machine migration management apparatus of a stopping success response through the migration pre-notification interface, so that the source virtual machine migration management apparatus stops, according to the stopping success response, the virtual machine from running and instructs a target virtual machine migration management apparatus on the target physical machine to restore the virtual machine on the target physical machine.

With reference to the first possible implementation manner of the fourth aspect, in a second possible implementation manner, the virtual machine further includes: a second obtaining module, configured to: when the virtual machine is restored by the target virtual machine migration management apparatus, obtain, through a migration completion notification interface, a temporary data process restarting notification notified by the target virtual machine migration management apparatus; and a starting module, configured to restart the stopped temporary data process according to the temporary data process restarting notification obtained by the second obtaining module.

With reference to the fourth aspect or with reference to the first or second possible implementation manner of the fourth aspect, in a third possible implementation manner, the determining module includes: an obtaining unit, configured to obtain, through a temporary data process registration interface, information about the temporary data process notified by an application; and a determining unit, configured to determine that memory pages occupied by the temporary data process are temporary data memory pages according to the information about the temporary data process obtained by the obtaining unit.

With reference to the fourth aspect or with reference to the first or second possible implementation manner of the fourth aspect, in a fourth possible implementation manner, the determining module is specifically configured to determine a temporary data dedicated memory block, and determine that all memory pages in the temporary data dedicated memory block are temporary data memory pages; and the virtual machine further includes: a third obtaining module, configured to obtain, through a process creation interface, a process type notified by the application, where the process type includes temporary data process or persistent data process; and an allocating module, configured to: when the process type obtained by the third obtaining module is temporary data process, allocate the memory pages in the temporary data dedicated memory block to the temporary data process.

According to a fifth aspect, an embodiment of the present invention provides a system for implementing hot migration of a virtual machine. The system includes any possible virtual machine migration management apparatus of the third aspect or the first to fourth possible virtual machine migration management apparatuses of the third aspect, and any possible virtual machine of the fourth aspect or the first to fourth possible virtual machines of the fourth aspect.

Based on the foregoing technical solutions, according to the method, the apparatus, and the system for implementing hot migration of a virtual machine of the embodiments of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

BRIEF DESCRIPTION OF THE DRAWINGS

To describe the technical solutions in the embodiments of the present invention more clearly, the following briefly introduces the accompanying drawings required for describing the embodiments of the present invention or the prior art. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that the technical solutions in the embodiments of the present invention may be applied to various virtual machine systems such as a virtual machine system based on vSphere software, a kernel-based virtual machine (K Virtual Machine, "KVM" for short), and a virtual machine system based on Xen software. It should also be understood that the technical solutions in the embodiments of the present invention may be applied to various virtualized computer systems, including a virtualized personal computer (Personal Computer, "PC" for short), a virtualized computer cluster system, a virtualized mainframe computer system, various virtualized supercomputers (Supercomputer), and the like.

Figure 1A:
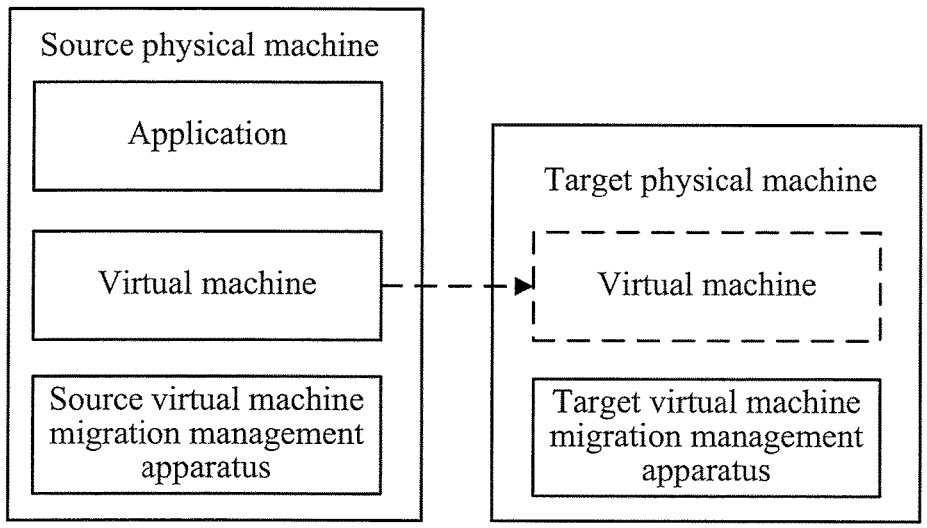
FIG. 1A is an architectural diagram of a system for implementing hot migration of a virtual machine according to an embodiment of the present invention.

FIG. 1A is an architectural diagram of a system for implementing hot migration of a virtual machine according to an embodiment of the present invention. An application on a source physical machine classifies processes into a temporary data process and a persistent data process, and notifies a virtual machine on the source physical machine of the classification. The virtual machine on the source physical machine determines temporary data memory pages occupied by the temporary data process and non-temporary data memory pages occupied by the persistent data process, and notifies a source virtual machine migration management apparatus on the source physical machine of the classification of the memory pages. In this way, when performing migration of the virtual machine from the source physical machine to a target physical machine, the source virtual machine migration management apparatus may use different copying strategies for the temporary data memory pages and the non-temporary data memory pages.

It should be noted that for exemplifying and non-limiting purposes, the source physical machine and the target physical machine shown in FIG. 1A may include supercomputers, mainframe computers, midrange computers, minicomputers, microcomputers, or various other physical devices capable of running a virtual machine, which is not limited in the present invention.

In addition, it should be noted that the application in the embodiment of the present invention may be various application programs, the source virtual machine migration management apparatus and a target virtual machine migration management apparatus may be implemented by dedicated hardware or may be implemented by software, which is not limited in the present invention.

Figure 1B:
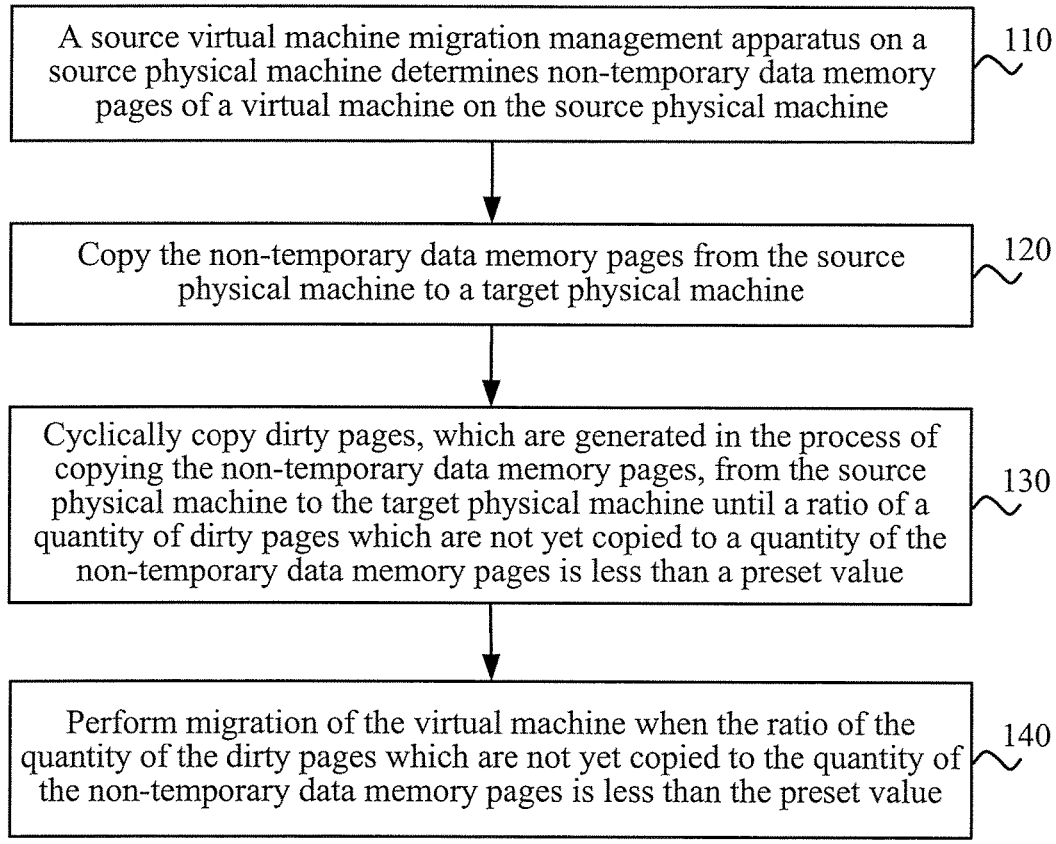
FIG. 1B is a schematic flowchart of a method for implementing hot migration of a virtual machine according to an embodiment of the present invention.

Based on the architectural diagram of the system shown in FIG. 1A, an embodiment of the present invention provides a method 100 for implementing hot migration of a virtual machine. The method 100 may be executed by a source virtual machine migration management apparatus on a source physical machine. As shown in FIG. 1B, the method 100 includes:

S110: A source virtual machine migration management apparatus on a source physical machine determines non-temporary data memory pages of a virtual machine on the source physical machine.

S120: Copy the non-temporary data memory pages from the source physical machine to a target physical machine.

S130: Cyclically copy dirty pages, which are generated in the process of copying the non-temporary data memory pages, from the source physical machine to the target physical machine until a ratio of a quantity of dirty pages which are not yet copied to a quantity of the non-temporary data memory pages is less than a preset value.

S140: Perform migration of the virtual machine when the ratio of the quantity of the dirty pages which are not yet copied to the quantity of the non-temporary data memory pages is less than the preset value.

Therefore, according to the method for implementing hot migration of a virtual machine of the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

In the embodiment of the present invention, an application in the multi-process system may classify processes into a temporary data process and a persistent data process according to functions and features of the processes, where the temporary data process only produces temporary data such as data in a temporary data buffer and a temporary variable, and the persistent data process is a process which can produce persistent data. Generally, processes produce data during running. The data may be temporary data or may be persistent data. Certainly, the produced data may also include both temporary data and persistent data. After a process is created, the application may determine whether the process produces persistent data, determine that the process is a temporary data process if the process only produces temporary data and does not produce persistent data, and determine that the process is a persistent data process if the process can produce persistent data. When determining that the process is a temporary data process, the application may notify a virtual machine of information about the temporary data process through a temporary data process registration interface. Optionally, when a process is created, the application may also determine whether the process is a temporary data process, and notify the virtual machine that the process is a temporary data process or a persistent data process through a process creation interface, so that the temporary data process is registered with the virtual machine. Specifically, the application may notify the virtual machine of the temporary data process only, and the virtual machine determines, by default, that a process of which the virtual machine is not notified is a persistent data process. Optionally, the application may also notify the virtual machine of both a temporary data process and a persistent data process, which is not limited in the embodiment of the present invention. A parameter of the temporary data process notified by the application to the virtual machine may be process information of the temporary data process, where the process information includes but is not limited to a process serial number of the temporary data process.

When the temporary data process is registered with the virtual machine, the virtual machine may monitor memory pages occupied by the temporary data process, and label the memory pages occupied by the temporary data process or memory pages in a dedicated memory block preset by the virtual machine and allocated to the temporary data process as temporary data process memory pages. Therefore, in the embodiment of the present invention, memory pages of the virtual machine may be classified into non-temporary data memory pages and temporary data memory pages, where the non-temporary data memory pages are memory pages occupied by a persistent data process. After determining temporary data memory pages, the virtual machine may notify a source virtual machine migration management apparatus of information about the temporary data memory pages, so that the source virtual machine migration management apparatus does not copy the temporary data memory pages when cyclically copying dirty pages.

Figure 2:
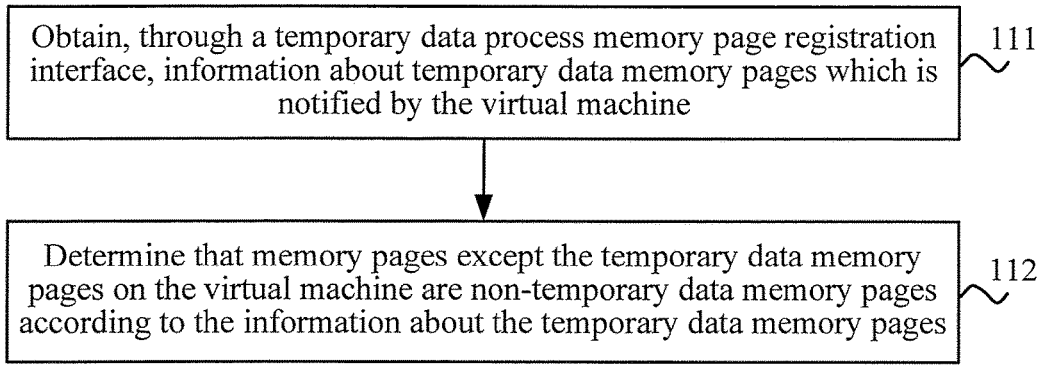
FIG. 2 is another schematic flowchart of a method for implementing hot migration of a virtual machine according to an embodiment of the present invention.

Optionally, as shown in FIG. 2, in an embodiment of the present invention, S110, in which a source virtual machine migration management apparatus determines non-temporary data memory pages of a virtual machine, includes:

S111: Obtain, through a temporary data process memory page registration interface, information about temporary data memory pages which is notified by the virtual machine.

S112: Determine that memory pages except the temporary data memory pages on the virtual machine are non-temporary data memory pages according to the information about the temporary data memory pages.

The information about the temporary data memory pages may include but is not limited to serial numbers of the temporary data memory pages and a quantity of the temporary data memory pages. The source virtual machine migration management apparatus may determine the temporary data memory pages according to the information about the temporary data memory pages, and determine that memory pages except the temporary data memory pages on the virtual machine are non-temporary data memory pages, but the embodiment of the present invention is not limited thereto.

The temporary data process memory page registration interface in the embodiment of the present invention may be used by the virtual machine to notify the virtual machine migration management apparatus of the information about the temporary data memory pages. It should be understood that the temporary data process memory page registration interface in the embodiment of the present invention is merely a name of an interface having the foregoing function, and optionally, the interface may also take other names. The interface should be determined according to the built-in function of the interface, and the name of the interface should not be construed as a limitation to the interface in the embodiment of the present invention.

Optionally, in the embodiment of the present invention, the virtual machine may store the information about the temporary data memory pages, and dynamically notify the source virtual machine migration management apparatus of the information about the temporary data memory pages. Specifically, when the number of temporary data memory pages occupied by a temporary data process increases or decreases, the virtual machine may only notify the source virtual machine migration management apparatus of information about a temporary data memory page which is newly occupied or no longer occupied, or may adjust the stored information about the temporary data memory pages according to the information about the temporary data memory page which is newly occupied or no longer occupied, and notify the source virtual machine migration management apparatus of the adjusted information about the temporary data memory pages, but the embodiment of the present invention is not limited thereto.

Optionally, as another embodiment, the virtual machine may also pre-allocate a temporary data dedicated memory block of a certain capacity to the temporary data process. Specifically, the virtual machine may allocate a memory block of a small capacity which acts as a temporary data dedicated memory block according to an actual requirement, and allocate memory pages of the temporary data dedicated memory block to the temporary data process. When remaining memory of the temporary data dedicated memory block is smaller than memory required for storing temporary data, the virtual machine selects a new memory block of a certain capacity and adds the new memory block to the temporary data dedicated memory block. In this way, the virtual machine can dynamically allocate a memory block to the temporary data process, which is convenient and may facilitate efficient utilization of memory. In this case, the virtual machine only needs to notify the source virtual machine migration management apparatus of information about all memory pages in the initial temporary data memory block, and when a change occurs in the temporary data memory block, notify the source virtual machine migration management apparatus of the change in the memory block, and does not need to notify the source virtual machine migration management apparatus when memory occupied by the temporary data process changes, thereby saving system overheads and facilitating management. However, the embodiment of the present invention is not limited thereto.

After determining the temporary data memory pages and the non-temporary data memory pages, the source virtual machine migration management apparatus may perform a by-pass (by-pass) function for the temporary data memory pages, that is, bypass the temporary data memory pages and only copy the non-temporary data memory pages, in a first copying process and a cyclical copying process of dirty pages. In S120, the source virtual machine migration management apparatus copies memory pages on the virtual machine for the first time, where only the non-temporary data memory pages are copied in the first copying process, and non-temporary data memory pages which are modified in the copying process are labeled as dirty pages. After the first copying process is completed, the source virtual machine migration management apparatus performs S130, that is, performs a cyclical copying process of dirty pages. When a ratio of a quantity of dirty pages which are not yet copied to a quantity of the non-temporary data memory pages is not less than a preset value, the source virtual machine migration management apparatus copies the dirty pages, which are not yet copied, from the source physical machine to the target physical machine.

Specifically, the source virtual machine migration management apparatus first copies the dirty pages generated in the first non-temporary data memory page copying process, and labels memory pages modified in the dirty page copying process as dirty pages. In each of subsequent dirty page copying processes, dirty pages generated in a previous dirty page copying process are copied. When a ratio of a quantity of dirty pages generated in a previous dirty page copying process to a quantity of the non-temporary data memory pages is less than the preset value, the cyclical copying process of dirty pages is ended. It should be noted that when a dirty page is copied from the source physical machine to the target physical machine, the copied dirty page on the source physical machine needs to be labeled as a non-dirty page, so as to prevent the dirty page from being copied again in a next dirty page copying process. The preset value may be a fixed value, but the embodiment of the present invention is not limited thereto.

Figure 3:
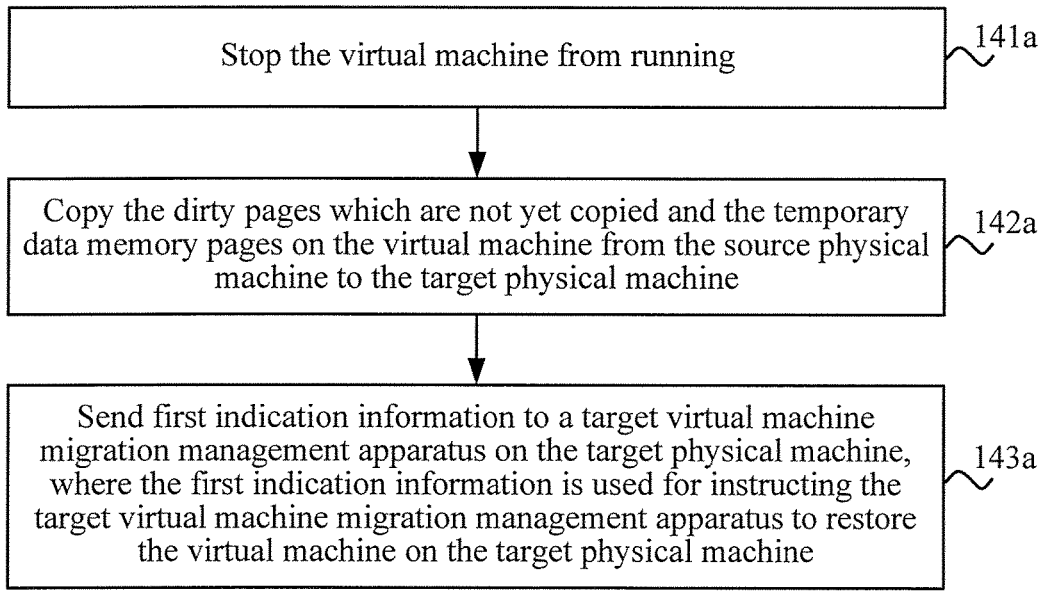
FIG. 3 is still another schematic flowchart of a method for implementing hot migration of a virtual machine according to an embodiment of the present invention.

In S140, the source virtual machine migration management apparatus may stop the virtual machine from running, and copy the dirty pages which are not yet copied in the cyclical copying process and the temporary data memory pages. Therefore, optionally, as shown in FIG. 3, S140 includes:

S141a: Stop the virtual machine from running.

S142a: Copy the dirty pages which are not yet copied and the temporary data memory pages on the virtual machine from the source physical machine to the target physical machine.

S143a: Send first indication information to a target virtual machine migration management apparatus on the target physical machine, where the first indication information is used for instructing the target virtual machine migration management apparatus to restore the virtual machine on the target physical machine.

The source virtual machine migration management apparatus stops the virtual machine from running, and after the virtual machine stops running, copies the dirty pages which are not yet copied, that is, dirty pages generated in a last copying process for cyclically copying dirty pages, and the temporary data memory pages from the source physical machine to the target physical machine. After the copying process is completed, the source virtual machine migration management apparatus sends first indication information to a target virtual machine migration management apparatus located on the target physical machine, so that the target virtual machine migration management apparatus restores the virtual machine on the target physical machine. The restoring the virtual machine on the target physical machine refers to starting the virtual machine on the target physical machine and restoring a state of the virtual machine to a state at the moment when the virtual machine is stopped from running on the source physical machine.

Therefore, according to the method for implementing hot migration of a virtual machine of the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

Figure 4:
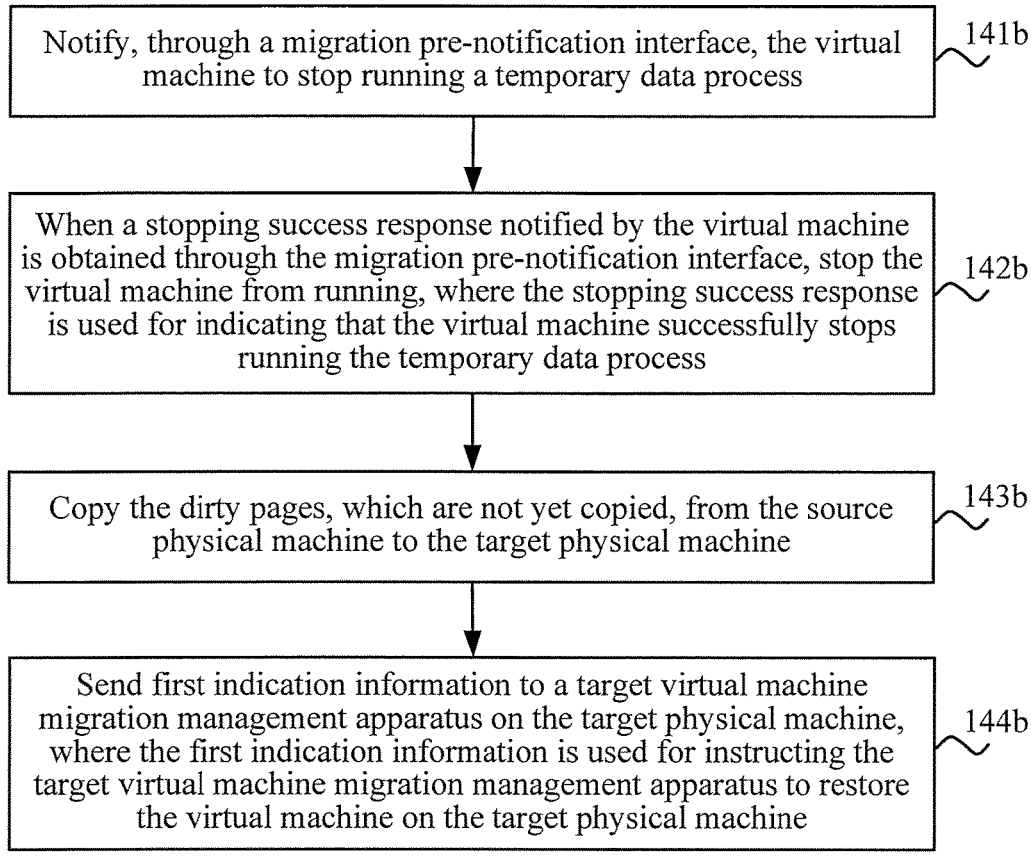
FIG. 4 is still another schematic flowchart of a method for implementing hot migration of a virtual machine according to an embodiment of the present invention.

Optionally, before stopping the virtual machine, the source virtual machine migration management apparatus may also notify the virtual machine to stop running a temporary data process, so that the temporary data memory pages occupied by the temporary data process are released. In this way, after the virtual machine stops running, only the remaining dirty pages are copied and the temporary data memory pages are not copied. Therefore, optionally, as another embodiment, as shown in FIG. 4, S140 includes:

S141*b*: Notify, through a migration pre-notification interface, the virtual machine to stop running a temporary data process.

S142*b*: When a stopping success response notified by the virtual machine is obtained through the migration pre-notification interface, stop the virtual machine from running, where the stopping success response is used for indicating that the virtual machine successfully stops running the temporary data process.

S143*b*: Copy the dirty pages, which are not yet copied, from the source physical machine to the target physical machine.

S144*b*: Send first indication information to a target virtual machine migration management apparatus on the target physical machine, where the first indication information is used for instructing the target virtual machine migration management apparatus to restore the virtual machine on the target physical machine.

The source virtual machine migration management apparatus may notify the virtual machine to stop running the temporary data process, and stop the virtual machine from running when obtaining a stopping success response, of the virtual machine, which indicates that the virtual machine successfully stops running the temporary data process. In this case, because before being stopped, the virtual machine already stops running the temporary data process, the memory pages occupied by the temporary data process are released, and the source virtual machine migration management apparatus may only copy the remaining dirty pages and does not copy the temporary data memory pages. In this way, a quantity of copied memory pages can be effectively reduced, time required by copying is shortened, consumption of a CPU and network bandwidth of a system is further reduced, and user experience is improved.

The migration pre-notification interface in the embodiment of the present invention may be used by the virtual machine migration management apparatus to notify the virtual machine to stop running the temporary data process, and may be used by the virtual machine to notify the virtual machine migration management apparatus of the stopping success response. It should be understood that the migration pre-notification interface in the embodiment of the present invention is merely a name of an interface having the foregoing function, and optionally, the interface may also take other names. The interface should be determined according to the built-in function of the interface, and the name of the interface should not be construed as a limitation to the interface in the embodiment of the present invention. It should be also understood that in the embodiment of the present invention, that A notifies B through a certain interface refers to that A sends a piece of information to B through the interface or A invokes the interface, but the embodiment of the present invention is not limited thereto.

Optionally, the source virtual machine migration management apparatus may also instruct the target virtual machine migration management apparatus to restart the temporary data process, which is stopped on the source physical machine, on the target physical machine after the virtual machine is restored, thereby facilitating continual use by a user. Therefore, optionally, the method 100 further includes:

S150: Send second indication information to the target virtual machine migration management apparatus, where the second indication information is used for instructing the target virtual machine migration management apparatus to notify, through a migration completion notification interface, the virtual machine to restart the stopped temporary data process.

The source virtual machine migration management apparatus may simultaneously send the first indication information and the second indication information to the target virtual machine migration management apparatus, or the virtual machine migration management apparatus may send the second indication information after sending the first indication information. Therefore, S150 and S144*b* may be performed simultaneously, or S150 may be performed after S144*b*, but the embodiment of the present invention is not limited thereto.

Optionally, the target virtual machine migration management apparatus may notify the virtual machine to restart the temporary data process on the target physical machine, or may notify the virtual machine to restart an application of the temporary data process and notify the application to restart the temporary data process, but the embodiment of the present invention is not limited thereto.

The migration completion notification interface in the embodiment of the present invention may be used by the virtual machine migration management apparatus to notify the virtual machine to restart the stopped temporary data process on the target physical machine. It should be understood that the migration completion notification interface in the embodiment of the present invention is merely a name of an interface having the foregoing function, and optionally, the interface may also take other names. The interface should be determined according to the built-in function of the interface, and the name of the interface should not be construed as a limitation to the interface in the embodiment of the present invention.

Therefore, according to the method for implementing hot migration of a virtual machine of the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

The foregoing describes in detail the method for implementing hot migration of a virtual machine according to the embodiment of the present invention from the perspective of a source virtual machine migration management apparatus with reference to FIG. 1 to FIG. 4. The following describes a method for implementing hot migration of a virtual machine according to an embodiment of the present invention from the perspective of a virtual machine with reference to FIG. 5 to FIG. 8.

Figure 5:
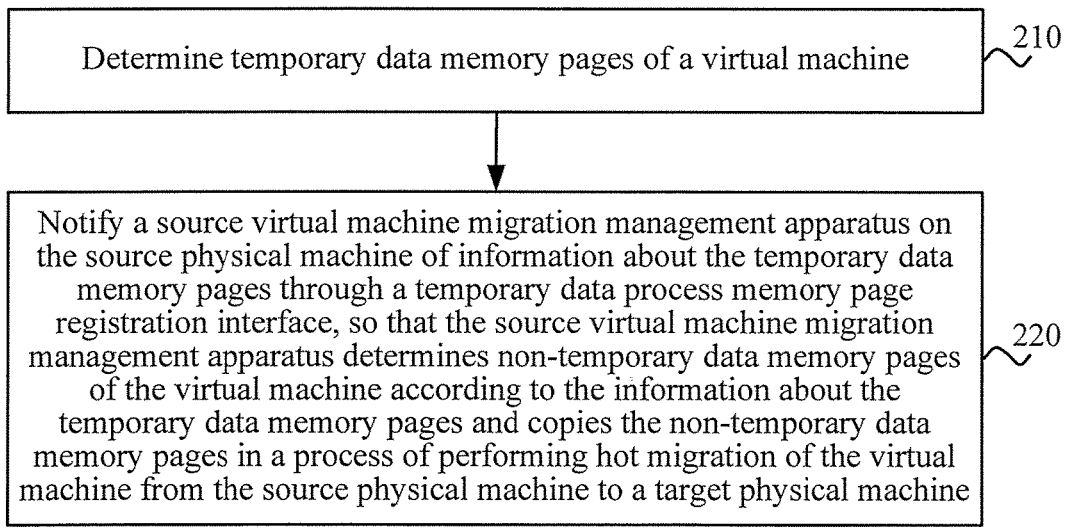
FIG. 5 is a schematic flowchart of a method for implementing hot migration of a virtual machine according to another embodiment of the present invention.

FIG. 5 is a schematic flowchart of a method 200 for implementing hot migration of a virtual machine according to an embodiment of the present invention. The method 200 may be executed by a virtual machine. As shown in FIG. 5, the method 200 includes:

S210: A virtual machine on a source physical machine determines temporary data memory pages of the virtual machine.

S220: Notify a source virtual machine migration management apparatus on the source physical machine of information about the temporary data memory pages through a temporary data process memory page registration interface, so that the source virtual machine migration management apparatus determines non-temporary data memory pages of the virtual machine according to the information about the temporary data memory pages and copies the non-temporary data memory pages in a process of performing hot migration of the virtual machine from the source physical machine to a target physical machine.

A virtual machine on a source physical machine determines temporary data memory pages, and notifies a source virtual machine migration management apparatus located on the source physical machine of information about the temporary data memory pages through a temporary data process memory page registration interface. The source virtual machine migration management apparatus determines the temporary data memory pages and non-temporary data memory pages on the virtual machine according to the information about the temporary data memory pages, and only copies the non-temporary data memory pages and does not copy the temporary data memory pages in a first memory page copying process and a cyclical copying process of dirty pages.

Therefore, according to the method for implementing hot migration of a virtual machine of the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

Figure 6:
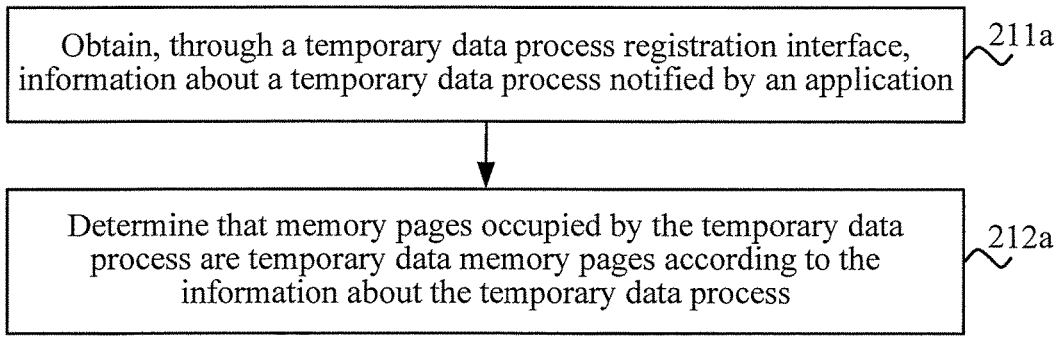
FIG. 6 is another schematic flowchart of a method for implementing hot migration of a virtual machine according to another embodiment of the present invention.

Optionally, the virtual machine may obtain, through a temporary data process registration interface, information about a temporary process notified by an application. As shown in FIG. 6, in an embodiment of the present invention, S210 includes:

S211*a*: Obtain, through a temporary data process registration interface, information about a temporary data process notified by an application.

S212*a*: Determine that memory pages occupied by the temporary data process are the temporary data memory pages according to the information about the temporary data process.

After creating a process, the application may determine whether the process is a temporary data process, and when the process is a temporary data process, notify the virtual machine of information about the temporary data process through the temporary data process registration interface.

The temporary data process registration interface in the embodiment of the present invention may be used by the application on the virtual machine to notify the virtual machine migration management apparatus of the information about the temporary data process. It should be understood that the temporary data process registration interface in the embodiment of the present invention is merely a name of an interface having the foregoing function, and optionally, the interface may also take other names. The interface should be determined according to the built-in function of the interface, and the name of the interface should not be construed as a limitation to the interface in the embodiment of the present invention.

Optionally, the virtual machine may also preset a dedicated memory block to be used by the temporary data process. Therefore, optionally, as another embodiment, S210 includes:

S211*b*: Determine a temporary data dedicated memory block.

S212*b*: Determine that all memory pages in the temporary data dedicated memory block are temporary data memory pages.

Figure 7:
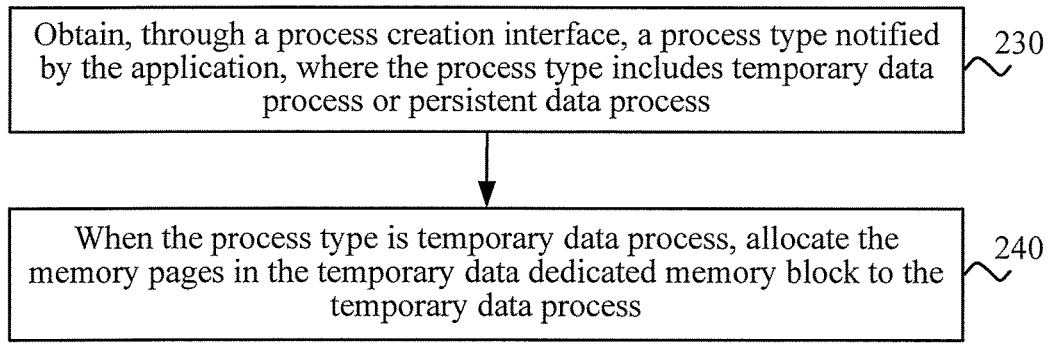
FIG. 7 is still another schematic flowchart of a method for implementing hot migration of a virtual machine according to another embodiment of the present invention.

Correspondingly, as shown in FIG. 7, the method 200 further includes:

S230: Obtain, through a process creation interface, a process type notified by the application, where the process type includes temporary data process or persistent data process.

S240: When the process type is temporary data process, allocate the memory pages in the temporary data dedicated memory block to the temporary data process.

The virtual machine may pre-allocate a temporary data dedicated memory block of a certain capacity to the temporary data process, and select memory from the temporary data dedicated memory block and allocate the memory to the temporary data process.

Optionally, when a process is created, the virtual machine determines whether the process is a temporary data process, and notifies the virtual machine that the process is a temporary data process or a persistent data process through a process creation interface, but the embodiment of the present invention is not limited thereto.

Figure 8:
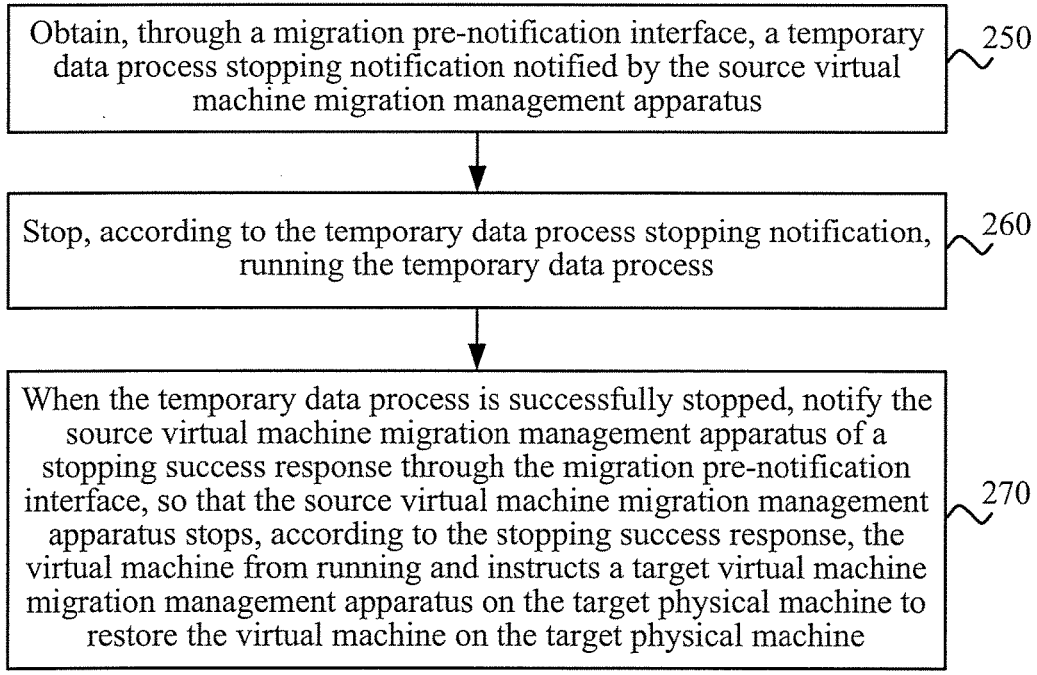
FIG. 8 is still another schematic flowchart of a method for implementing hot migration of a virtual machine according to another embodiment of the present invention.

Optionally, as shown in FIG. 8, in an embodiment of the present invention, after S220, the method 200 further includes:

S250: Obtain, through a migration pre-notification interface, a temporary data process stopping notification notified by the source virtual machine migration management apparatus.

S260: Stop, according to the temporary data process stopping notification, running the temporary data process.

S270: When the temporary data process is successfully stopped, notify the source virtual machine migration management apparatus of a stopping success response through the migration pre-notification interface, so that the source virtual machine migration management apparatus stops, according to the stopping success response, the virtual machine from running and instructs a target virtual machine migration management apparatus on the target physical machine to restore the virtual machine on the target physical machine.

Because before being stopped, the virtual machine already stops running the temporary data process, the memory pages occupied by the temporary data process are released, and the source virtual machine migration management apparatus may only copy the remaining dirty pages and does not copy the temporary data memory pages. In this way, a quantity of copied memory pages can be effectively reduced, time required by copying is shortened, consumption of a CPU and network bandwidth of a system is further reduced, and user experience is improved.

Figure 9:
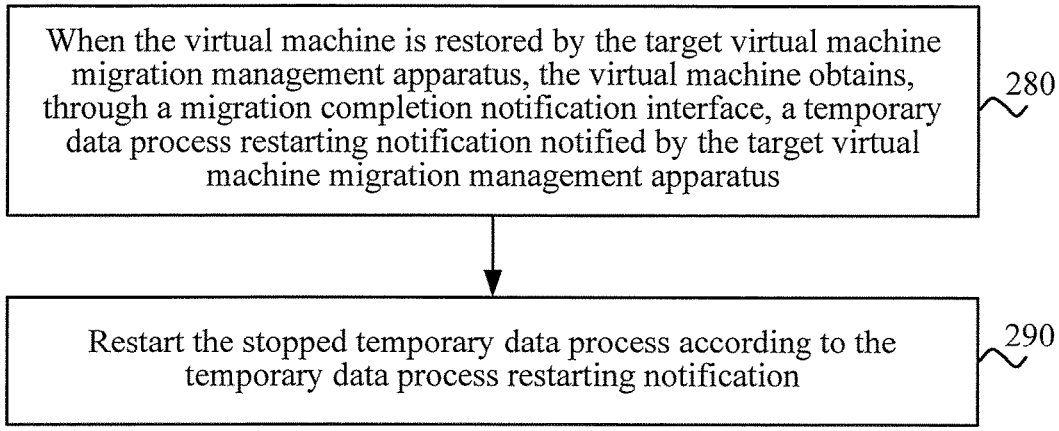
FIG. 9 is still another schematic flowchart of a method for implementing hot migration of a virtual machine according to another embodiment of the present invention.

Optionally, as shown in FIG. 9, in an embodiment of the present invention, the method 200 further includes:

S280: When the virtual machine is restored by the target virtual machine migration management apparatus, the virtual machine obtains, through a migration completion notification interface, a temporary data process restarting notification notified by the target virtual machine migration management apparatus.

S290: Restart the stopped temporary data process according to the temporary data process restarting notification.

Therefore, according to the method for implementing hot migration of a virtual machine of the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

It should be understood that the various interfaces in the foregoing embodiments may also take other names. These interfaces should be determined according to the built-in functions of the interfaces, and the names of these interfaces should not be construed as limitations to these interfaces in the embodiments of the present invention.

The foregoing describes in detail the method for implementing hot migration of a virtual machine according to the embodiments of the present invention with reference to FIG. 1 to FIG. 9. The following describes in detail a virtual machine migration management apparatus and a virtual machine according to embodiments of the present invention with reference to FIG. 10 to FIG. 13.

Figure 10:
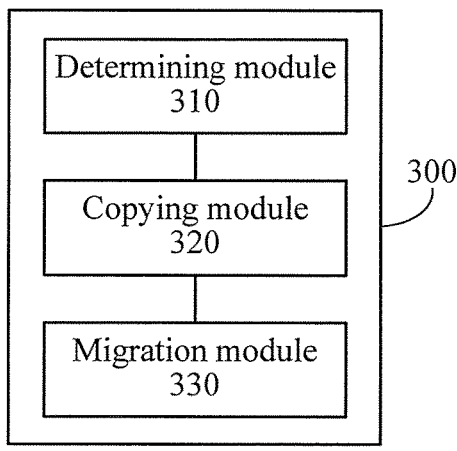
FIG. 10 is a schematic block diagram of a virtual machine migration management apparatus according to an embodiment of the present invention.

FIG. 10 is a schematic block diagram of a virtual machine migration management apparatus 300 according to an embodiment of the present invention. As shown in FIG. 10, the virtual machine migration management apparatus 300 includes:

a determining module 310, configured to determine non-temporary data memory pages of a virtual machine on a source physical machine;

a copying module 320, configured to copy the non-temporary data memory pages determined by the determining module 310 from the source physical machine to a target physical machine, and cyclically copy dirty pages, which are generated in the process of copying the non-temporary data memory pages, from the source physical machine to the target physical machine until a ratio of a quantity of dirty pages which are not yet copied to a quantity of the non-temporary data memory pages is less than a preset value; and a migration module 330, configured to perform migration of the virtual machine when the ratio of the quantity of the dirty pages which are not yet copied by the copying module 320 to the quantity of the non-temporary data memory pages is less than the preset value.

Therefore, according to the virtual machine migration management apparatus in the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

Figure 11:
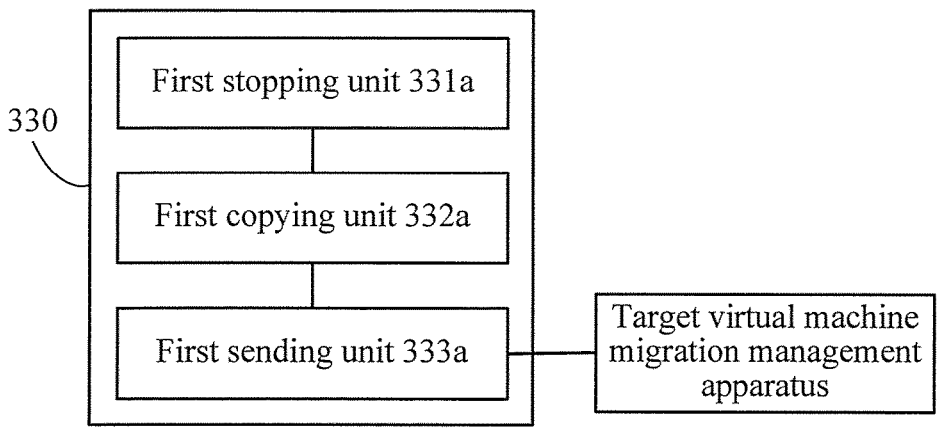
FIG. 11 is a schematic block diagram of a migration module of a virtual machine migration management apparatus according to an embodiment of the present invention.

Optionally, the virtual machine migration management apparatus may stop the virtual machine and copy the temporary data memory pages. As shown in FIG. 11, the migration module 330 includes:

a first stopping unit 331a, configured to stop the virtual machine from running;

a first copying unit 332a, configured to: after the first stopping unit 331a stops the virtual machine from running, copy the dirty pages which are not yet copied and temporary data memory pages on the virtual machine from the source physical machine to the target physical machine; and a first sending unit 333a, configured to: after the first copying unit 332a copies the dirty pages which are not yet copied and the temporary data memory pages on the virtual machine, send first indication information to a target virtual machine migration management apparatus on the target physical machine, where the first indication information is used for instructing the target virtual machine migration management apparatus to restore the virtual machine on the target physical machine.

Figure 12:
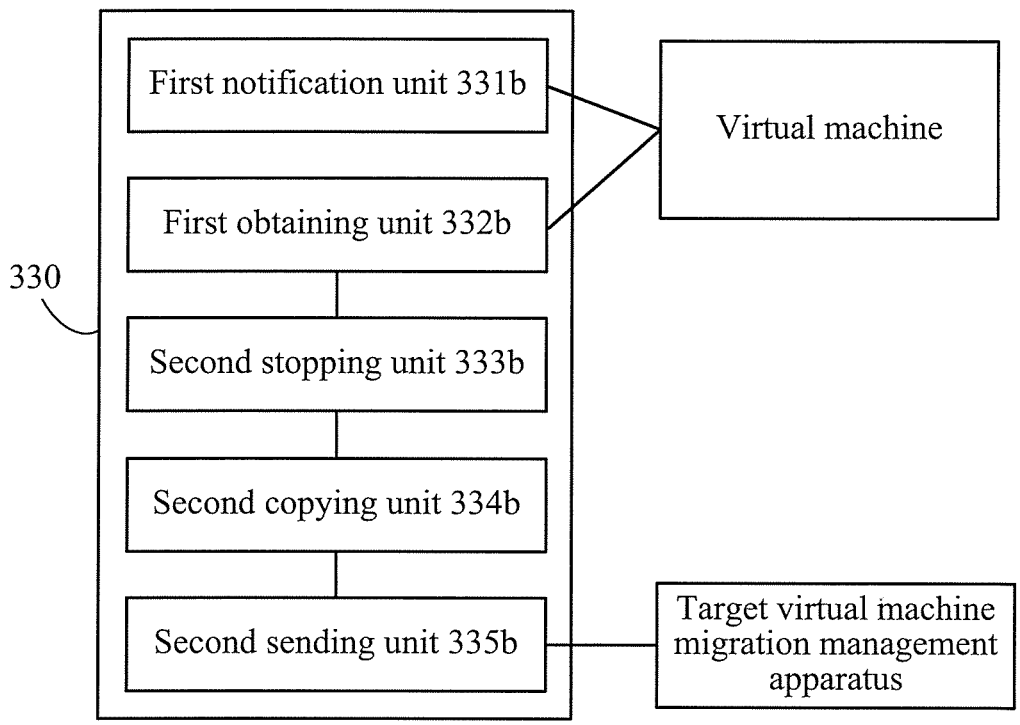
FIG. 12 is another schematic block diagram of a migration module of a virtual machine migration management apparatus according to an embodiment of the present invention.

Optionally, before stopping the virtual machine from running, the virtual machine migration management apparatus may also stop a temporary data process from running, so that when the virtual machine is stopped, the temporary data memory pages do not need to be copied. Therefore, optionally, as another embodiment, as shown in FIG. 12, the migration module 330 includes:

a first notification unit 331b, configured to notify, through a migration pre-notification interface, the virtual machine to stop running a temporary data process;

a first obtaining unit 332b, configured to obtain, through the migration pre-notification interface, a stopping success response notified by the virtual machine, where the stopping success response is used for indicating that the virtual machine successfully stops, according to a notification of the first notification unit 331b, running the temporary data process;

a second stopping unit 333b, configured to: when the first obtaining unit 332b obtains the stopping success response notified by the virtual machine, stop the virtual machine from running;

a second copying unit 334b, configured to: when the second stopping unit 333b stops the virtual machine from running, copy the dirty pages, which are not yet copied, from the source physical machine to the target physical machine; and a second sending unit 335b, configured to: after the second copying unit 334b copies the dirty pages, which are not yet copied, from the source physical machine to the target physical machine, send first indication information to a target virtual machine migration management apparatus on the target physical machine, where the first indication information is used for instructing the target virtual machine migration management apparatus to restore the virtual machine on the target physical machine.

Figure 13:
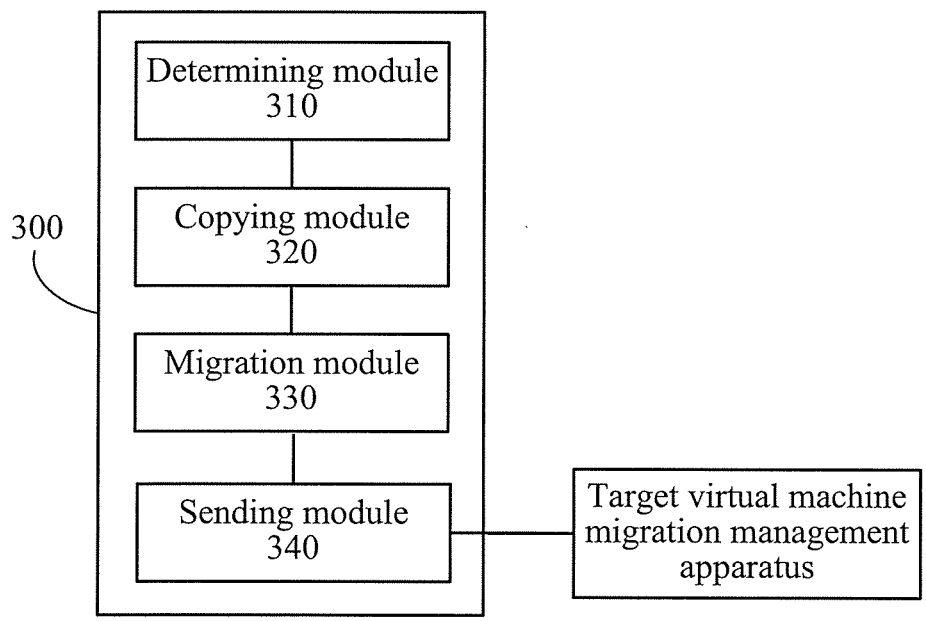
FIG. 13 is another schematic block diagram of a virtual machine migration management apparatus according to an embodiment of the present invention.

Optionally, as another embodiment, as shown in FIG. 13, the virtual machine migration management apparatus 300 further includes: a sending module 340, configured to send second indication information to the target virtual machine migration management apparatus, where the second indication information is used for instructing the target virtual machine migration management apparatus to notify, through a migration completion notification interface, the virtual machine to restart the stopped temporary data process.

Figure 14:
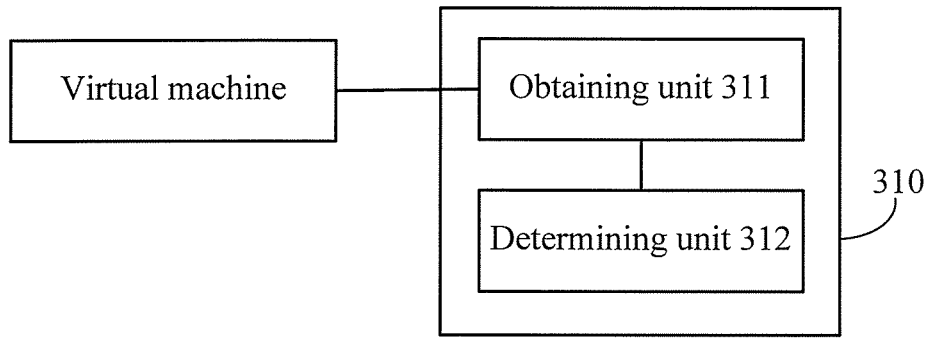
FIG. 14 is a schematic block diagram of a determining module of a virtual machine migration management apparatus according to an embodiment of the present invention.

Optionally, as another embodiment, as shown in FIG. 14, the determining module 310 includes:

an obtaining unit 311, configured to obtain, through a temporary data process memory page registration interface, information about the temporary data memory pages which is notified by the virtual machine; and a determining unit 312, configured to determine that memory pages except the temporary data memory pages on the virtual machine are non-temporary data memory pages according to the information about the temporary data memory pages obtained by the obtaining unit 311.

It should be understood that the virtual machine migration management apparatus 300 according to the embodiment of the present invention may correspond to the source virtual machine migration management apparatus in the embodiments of the present invention, and the foregoing and other operations and/or functions of the modules in the virtual machine migration management apparatus 300 are separately used for implementing corresponding processes in the methods in FIG. 1 to FIG. 4, which are not described repeatedly herein for brevity.

Therefore, according to the virtual machine migration management apparatus in the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

Figure 15:
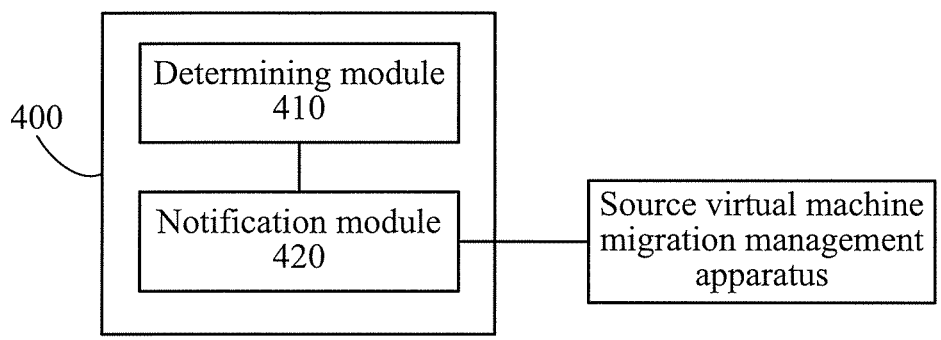
FIG. 15 is a schematic block diagram of a virtual machine according to an embodiment of the present invention.

FIG. 15 shows a schematic block diagram of a virtual machine 400 according to an embodiment of the present invention. The virtual machine is located on a source physical machine. It should be noted that the virtual machine may be also applied to a target physical machine, which is not limited in the present invention. As shown in FIG. 15, the virtual machine 400 includes:

a determining module 410, configured to determine temporary data memory pages of the virtual machine on the source physical machine;

a notification module 420, configured to notify, through a temporary data process memory page registration interface, a source virtual machine migration management apparatus on the source physical machine of information about the temporary data memory pages determined by the determining module 410, so that the source virtual machine migration management apparatus determines non-temporary data memory pages of the virtual machine according to the information about the temporary data memory pages and copies the non-temporary data memory pages in a process of performing hot migration of the virtual machine from the source physical machine to a target physical machine.

Therefore, according to the virtual machine in the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

Figure 16:
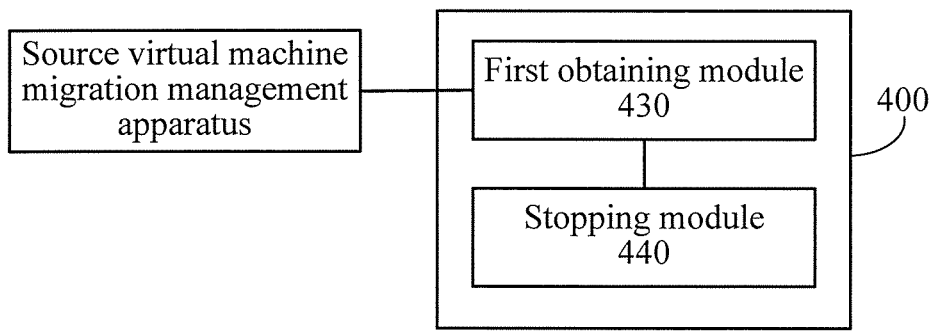
FIG. 16 is another schematic block diagram of a virtual machine according to an embodiment of the present invention.

Optionally, as shown in FIG. 16, in an embodiment of the present invention, the virtual machine 400 further includes:

a first obtaining module 430, configured to: after the notification module 420 notifies the source virtual machine migration management apparatus on the source physical machine of the information about the temporary data memory pages through the temporary data process memory page registration interface, obtain, through a migration pre-notification interface, a temporary data process stopping notification notified by the source virtual machine migration management apparatus; and a stopping module 440, configured to stop, according to the temporary data process stopping notification obtained by the first obtaining module 430, running a temporary data process; and the notification module 420 is further configured to: when the stopping module 440 successfully stops running the temporary data process, notify the source virtual machine migration management apparatus of a stopping success response through the migration pre-notification interface, so that the source virtual machine migration management apparatus stops, according to the stopping success response, the virtual machine from running and instructs a target virtual machine migration management apparatus on the target physical machine to restore the virtual machine on the target physical machine.

Figure 17:
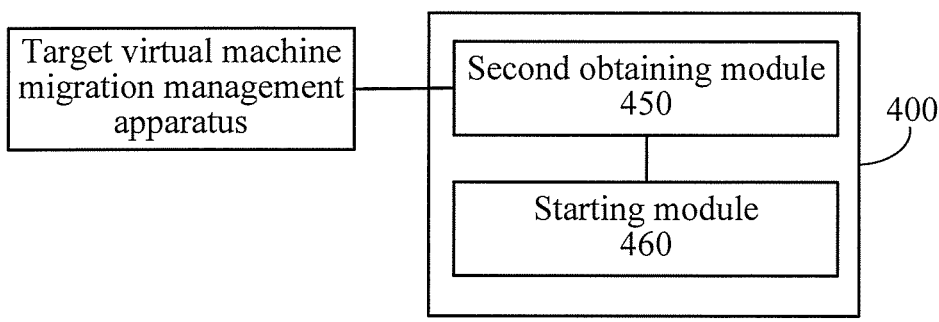
FIG. 17 is still another schematic block diagram of a virtual machine according to an embodiment of the present invention.

Optionally, as another embodiment, as shown in FIG. 17, the virtual machine 400 further includes:

a second obtaining module 450, configured to: when the virtual machine is restored by the target virtual machine migration management apparatus, obtain, through a migration completion notification interface, a temporary data process restarting notification notified by the target virtual machine migration management apparatus; and a starting module 460, configured to restart the stopped temporary data process according to the temporary data process restarting notification obtained by the second obtaining module 450.

Figure 18:
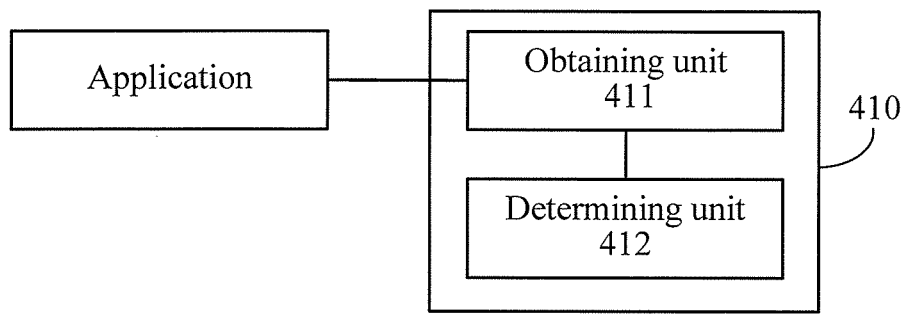
FIG. 18 is a schematic block diagram of a determining module of a virtual machine according to an embodiment of the present invention.

Optionally, after a process is created, an application may notify the virtual machine of the temporary data process through a temporary data process registration interface. Therefore, as another embodiment, as shown in FIG. 18, the determining module 410 includes:

an obtaining unit 411, configured to obtain, through a temporary data process registration interface, information about the temporary data process notified by an application; and a determining unit 412, configured to determine that memory pages occupied by the temporary data process are the temporary data memory pages according to the information about the temporary data process obtained by the obtaining unit 411.

Optionally, as another embodiment, the determining module 410 is specifically configured to determine a temporary data dedicated memory block, and determine that all memory pages in the temporary data dedicated memory block are temporary data memory pages.

Figure 19:
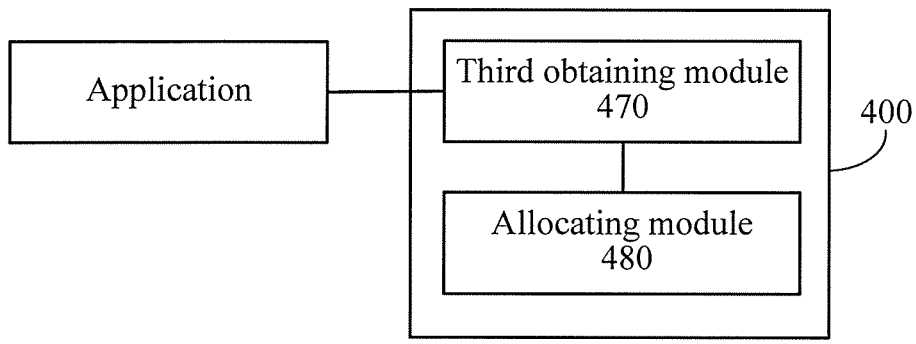
FIG. 19 is still another schematic block diagram of a virtual machine according to an embodiment of the present invention.

When a process is created, the application may notify the virtual machine of the temporary data process through a process creation interface, and the virtual machine allocates corresponding memory to the temporary data process. Therefore, as shown in FIG. 19, the virtual machine 400 further includes:

a third obtaining module 470, configured to obtain, through a process creation interface, a process type notified by the application, where the process type includes temporary data process or persistent data process; and an allocating module 480, configured to: when the process type obtained by the third obtaining module 470 is temporary data process, allocate the memory pages in the temporary data dedicated memory block to the temporary data process.

It should be understood that the virtual machine 400 according to the embodiment of the present invention may correspond to the virtual machine in the embodiments of the present invention, and the foregoing and other operations and/or functions of the modules in the virtual machine 400 are separately used for implementing corresponding processes in the methods in FIG. 5 to FIG. 9, which are not described repeatedly herein for brevity.

Therefore, according to the virtual machine in the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

Figure 20:
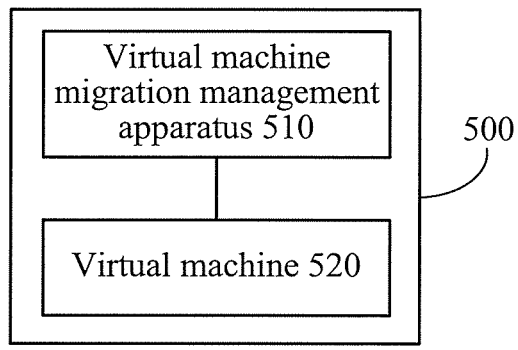
FIG. 20 is a schematic block diagram of a system for implementing hot migration of a virtual machine according to an embodiment of the present invention.

FIG. 20 is a schematic block diagram of a system 500 for implementing hot migration of a virtual machine according to an embodiment of the present invention. The system for implementing hot migration of a virtual machine may be the source physical machine or the target physical machine in the foregoing description of the methods and the apparatuses, or may be another system besides the source physical machine or the target physical machine, which is not limited in the embodiment of the present invention. As shown in FIG. 20, the system 500 includes a virtual machine migration management apparatus 510 and a virtual machine 520, where the virtual machine migration management apparatus 510 may be any one of the virtual machine migration management apparatuses described in FIG. 10 to FIG. 14, and the virtual machine 520 may be any one of the virtual machines described in FIG. 15 to FIG. 19.

Therefore, according to the system for implementing hot migration of a virtual machine of the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

Figure 21:
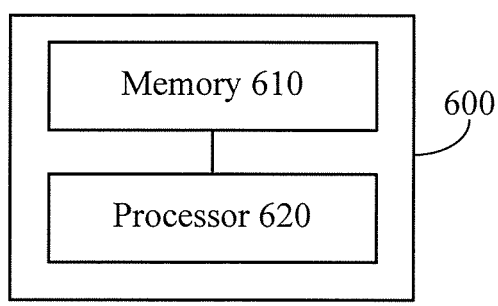
FIG. 21 is a schematic block diagram of a virtual machine migration management apparatus according to another embodiment of the present invention.

FIG. 21 is a schematic block diagram of a virtual machine migration management apparatus 600 according to an embodiment of the present invention. As shown in FIG. 21, the virtual machine migration management apparatus 600 includes a memory 610 and a processor 620, for example, a CPU. The processor 620 is configured to execute an instruction stored by the memory 610. Specifically, the processor 620 is specifically configured to determine non-temporary data memory pages of a virtual machine on a source physical machine, copy the non-temporary data memory pages from the source physical machine to a target physical machine, cyclically copy dirty pages, which are generated in the process of copying the non-temporary data memory pages, from the source physical machine to the target physical machine until a ratio of a quantity of dirty pages which are not yet copied to a quantity of the non-temporary data memory pages is less than a preset value, and perform migration of the virtual machine when the ratio of the quantity of the dirty pages which are not yet copied to the quantity of the non-temporary data memory pages is less than the preset value.

Therefore, according to the virtual machine migration management apparatus in the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

Optionally, in an embodiment of the present invention, the processor 620 is further configured to stop the virtual machine from running, and copy the dirty pages which are not yet copied and temporary data memory pages on the virtual machine from the source physical machine to the target physical machine.

Figure 22:
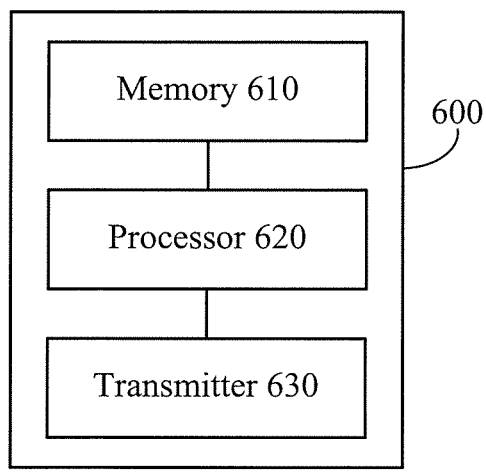
FIG. 22 is another schematic block diagram of a virtual machine migration management apparatus according to another embodiment of the present invention.

Correspondingly, as shown in FIG. 22, the virtual machine migration management apparatus 600 further includes:

a transmitter 630, configured to send first indication information to a target virtual machine migration management apparatus on the target physical machine, where the first indication information is used for instructing the target virtual machine migration management apparatus to restore the virtual machine on the target physical machine.

Optionally, as another embodiment, the processor 620 is further configured to notify, through a migration pre-notification interface, the virtual machine to stop running a temporary data process, obtain, through the migration pre-notification interface, a stopping success response notified by the virtual machine and used for indicating that the virtual machine successfully stops running the temporary data process, and when the stopping success response notified by the virtual machine is obtained, stop the virtual machine from running, and copy the dirty pages, which are not yet copied, from the source physical machine to the target physical machine; and the transmitter 630 is further configured to: after the virtual machine stops running, send first indication information to a target virtual machine migration management apparatus on the target physical machine, where the first indication information is used for instructing the target virtual machine migration management apparatus to restore the virtual machine on the target physical machine.

Optionally, as another embodiment, the transmitter 630 is further configured to send second indication information to the target virtual machine migration management apparatus, where the second indication information is used for instructing the target virtual machine migration management apparatus to notify, through a migration completion notification interface, the virtual machine to restart the stopped temporary data process.

Optionally, as another embodiment, the processor 620 is further configured to obtain, through a temporary data process memory page registration interface, information about the temporary data memory pages which is notified by the virtual machine, and determine that memory pages except the temporary data memory pages on the virtual machine are non-temporary data memory pages according to the information about the temporary data memory pages.

It should be understood that the virtual machine migration management apparatus 600 according to the embodiment of the present invention may correspond to the source virtual machine migration management apparatus in the embodiments of the present invention, and the foregoing and other operations and/or functions of the modules in the virtual machine migration management apparatus 600 are separately used for implementing corresponding processes in the methods in FIG. 1 to FIG. 4, which are not described repeatedly herein for brevity.

Therefore, according to the virtual machine migration management apparatus in the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

Figure 23:
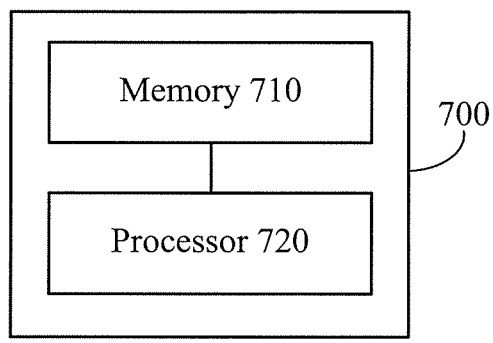
FIG. 23 is a schematic block diagram of a virtual machine according to another embodiment of the present invention.

FIG. 23 is a schematic block diagram of a virtual machine 700 according to an embodiment of the present invention. As shown in FIG. 23, the virtual machine 700 includes a memory 710 and a processor 720. The processor 720 is configured to execute an instruction stored by the memory 710. Specifically, the processor 720 is specifically configured to determine temporary data memory pages of the virtual machine on a source physical machine, and notify a source virtual machine migration management apparatus on the source physical machine of information about the temporary data memory pages through a temporary data process memory page registration interface, so that the source virtual machine migration management apparatus determines non-temporary data memory pages of the virtual machine according to the information about the temporary data memory pages and copies the non-temporary data memory pages in a process of performing hot migration of the virtual machine from the source physical machine to a target physical machine.

Optionally, in an embodiment of the present invention, the processor 720 is further configured to obtain, through a migration pre-notification interface, a temporary data process stopping notification notified by the source virtual machine migration management apparatus, stop, according to the temporary data process stopping notification, running a temporary data process, and when the temporary data process is successfully stopped, notify the source virtual machine migration management apparatus of a stopping success response through the migration pre-notification interface, so that the source virtual machine migration management apparatus stops, according to the stopping success response, the virtual machine from running and instructs a target virtual machine migration management apparatus on the target physical machine to restore the virtual machine on the target physical machine.

Optionally, as another embodiment, the processor 720 is further configured to: when the virtual machine is restored by the target virtual machine migration management apparatus, obtain, through a migration completion notification interface, a temporary data process restarting notification notified by the target virtual machine migration management apparatus, and restart the stopped temporary data process according to the temporary data process restarting notification.

Optionally, as another embodiment, the processor 720 is further configured to obtain, through a temporary data process registration interface, information about the temporary data process notified by an application, and determine that memory pages occupied by the temporary data process are the temporary data memory pages according to the information about the temporary data process.

Optionally, as another embodiment, the processor 720 is further configured to determine a temporary data dedicated memory block, determine that all memory pages in the temporary data dedicated memory block are temporary data memory pages, obtain, through a process creation interface, a process type notified by the application, where the process type includes temporary data process or persistent data process, and when the process type is temporary data process, allocate the memory pages in the temporary data dedicated memory block to the temporary data process.

It should be understood that the virtual machine 700 according to the embodiment of the present invention may correspond to the virtual machine in the embodiments of the present invention, and the foregoing and other operations and/or functions of the modules in the virtual machine 700 are separately used for implementing corresponding processes in the methods in FIG. 5 to FIG. 9, which are not described repeatedly herein for brevity.

Therefore, according to the virtual machine in the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

Figure 24:
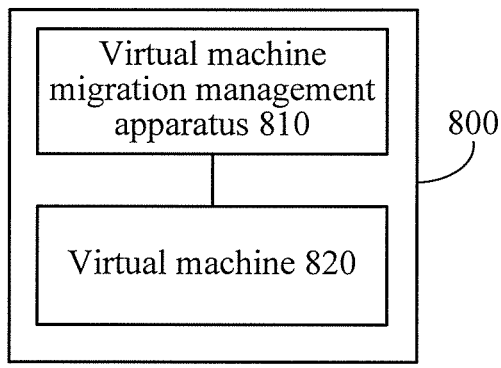
FIG. 24 is a schematic block diagram of a system for implementing hot migration of a virtual machine according to another embodiment of the present invention.

FIG. 24 is a schematic block diagram of a system 800 for implementing hot migration of a virtual machine according to an embodiment of the present invention. The system for implementing hot migration of a virtual machine may be the source physical machine or the target physical machine in the foregoing description of the methods and the apparatuses, or may be another system besides the source physical machine or the target physical machine, which is not limited in the embodiment of the present invention. As shown in FIG. 24, the system 800 includes a virtual machine migration management apparatus 810 and a virtual machine 820, where the virtual machine migration management apparatus 810 may be any one of the virtual machine migration management apparatuses described in FIG. 21 to FIG. 22, and the virtual machine 820 may be the virtual machine described in FIG. 23.

Therefore, according to the system for implementing hot migration of a virtual machine of the embodiment of the present invention, processes and memory pages in a multi-process system are classified, so that temporary data memory pages are not copied and only non-temporary data memory pages are copied in a cyclical copying process of dirty pages, thereby reducing time consumption of virtual machine hot migration, reducing a waste of system resources such as a CPU and network bandwidth of a system caused by changes in temporary data, saving system resources, and improving user experience.

It should be understood that the various interfaces in the foregoing embodiments may also take other names. These interfaces should be determined according to the built-in functions of the interfaces, and the names of these interfaces should not be construed as limitations to these interfaces in the embodiments of the present invention.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for implementing hot migration of a virtual machine executed in a source virtual machine migration management apparatus on a source physical machine, the method comprising:
   determining temporary data memory pages and non-temporary data memory pages of a virtual machine on the source physical machine, wherein the temporary data memory pages are memory pages occupied by a temporary data process, and the non-temporary data memory pages are memory pages occupied by a persistent data process;
   copying the non-temporary data memory pages from the source physical machine to a target physical machine;
   cyclically copying dirty pages, which are generated in the process of copying the non-temporary data memory pages, from the source physical machine to the target physical machine until a ratio of a quantity of dirty pages which are not yet copied to a quantity of the non-temporary data memory pages is less than a preset value; and
   performing migration of the virtual machine when the ratio of the quantity of the dirty pages which are not yet copied to the quantity of the non-temporary data memory pages is less than the preset value;
   wherein determining non-temporary data memory pages of a virtual machine on the source physical machine comprises:
      obtaining, through a temporary data process memory page registration interface, information about the temporary data memory pages which is notified by the virtual machine; and
      determining that memory pages except the temporary data memory pages of the virtual machine are non-temporary data memory pages according to the information about the temporary data memory pages.

2. The method according to claim 1, wherein performing migration of the virtual machine comprises:
   stopping the virtual machine from running;
   copying the dirty pages which are not yet copied and temporary data memory pages of the virtual machine from the source physical machine to the target physical machine; and
   sending first indication information to a target virtual machine migration management apparatus on the target physical machine, wherein the first indication information is used for instructing the target virtual machine migration management apparatus to restore the virtual machine on the target physical machine.

3. The method according to claim 1, wherein performing migration of the virtual machine comprises:
   notifying, through a migration pre-notification interface, the virtual machine to stop running a temporary data process;
   stopping running the virtual machine when a stopping success response notified by the virtual machine is obtained through the migration pre-notification interface, wherein the stopping success response is used for indicating that the virtual machine successfully stops running the temporary data process;
   copying the dirty pages, which are not yet copied, and temporary data memory pages of the virtual machine from the source physical machine to the target physical machine; and
   sending first indication information to a target virtual machine migration management apparatus on the target physical machine, wherein the first indication information is used for instructing the target virtual machine migration management apparatus to restore the virtual machine on the target physical machine.

4. The method according to claim 3, wherein the method further comprises:
   sending second indication information to the target virtual machine migration management apparatus, wherein the second indication information is used for instructing the target virtual machine migration management apparatus to notify, through a migration completion notification interface, the virtual machine on the target physical machine to restart the stopped temporary data process.

5. A virtual machine migration management apparatus comprising:
- a processor and a memory coupled to the processor, wherein the processor is configured to:
- determine temporary data memory pages and non-temporary data memory pages of a virtual machine on a source physical machine, wherein the temporary data memory pages are memory pages occupied by a temporary data process, and the non-temporary data memory pages are memory pages occupied by a persistent data process;
- copy the non-temporary data memory pages from the source physical machine to a target physical machine;
- cyclically copy dirty pages, which are generated in the process of copying the non-temporary data memory pages, from the source physical machine to the target physical machine until a ratio of a quantity of dirty pages which are not yet copied to a quantity of the non-temporary data memory pages is less than a preset value; and
- perform migration of the virtual machine when the ratio of the quantity of the dirty pages which are not yet copied to the quantity of the non-temporary data memory pages is less than the preset value;
- wherein when the non-temporary data memory pages is determined, the processor is configured to:
  - obtain, through a temporary data process memory page registration interface, information about the temporary data memory pages which is notified by the virtual machine, and determine that memory pages except the temporary data memory pages of the virtual machine are non-temporary data memory pages according to the information about the temporary data memory pages.

6. The virtual machine migration management apparatus according to claim 5, wherein:
- when migration is performed, the processor is configured to:
  - stop the virtual machine from running, and
  - copy the dirty pages which are not yet copied and temporary data memory pages of the virtual machine from the source physical machine to the target physical machine; and
- the virtual machine migration management apparatus further comprises:
  - a transmitter, configured to send first indication information to a target virtual machine migration management apparatus on the target physical machine, wherein the first indication information is used for instructing the target virtual machine migration management apparatus to restore the virtual machine on the target physical machine.

7. The virtual machine migration management apparatus according to claim 5, wherein:
- when migration is performed, the processor is configured to:
  - notify, through a migration pre-notification interface, the virtual machine to stop running a temporary data process,
  - obtain, through the migration pre-notification interface, a stopping success response notified by the virtual machine and used for indicating that the virtual machine successfully stops running the temporary data process,
  - stop the virtual machine from running when the stopping success response notified by the virtual machine is obtained, and
  - copy the dirty pages, which are not yet copied, and temporary data memory pages of the virtual machine from the source physical machine to the target physical machine; and
- the virtual machine migration management apparatus further comprises:
  - a transmitter, configured to send first indication information to a target virtual machine migration management apparatus on the target physical machine, wherein the first indication information is used for instructing the target virtual machine migration management apparatus to restore the virtual machine on the target physical machine.

8. The virtual machine migration management apparatus according to claim 7, wherein the transmitter is further configured to:
- send second indication information to the target virtual machine migration management apparatus, wherein the second indication information is used for instructing the target virtual machine migration management apparatus to notify, through a migration completion notification interface, the virtual machine on the target physical machine to restart the stopped temporary data process.

* * * * *